(12) United States Patent
Aoki et al.

(10) Patent No.: US 11,057,291 B2
(45) Date of Patent: Jul. 6, 2021

(54) TEST SYSTEM

(71) Applicant: ADVANTEST CORPORATION, Tokyo (JP)

(72) Inventors: Yoshiyuki Aoki, Tokyo (JP); Kazuhiro Iezumi, Tokyo (JP); Tomoyuki Itakura, Tokyo (JP); Shuichi Inage, Tokyo (JP)

(73) Assignee: ADVANTEST CORPORATION, Tokyo (JP)

( * ) Notice: Subject to any disclaimer, the term of this patent is extended or adjusted under 35 U.S.C. 154(b) by 0 days.

(21) Appl. No.: 16/580,471

(22) Filed: Sep. 24, 2019

(65) Prior Publication Data

US 2020/0280505 A1 Sep. 3, 2020

(30) Foreign Application Priority Data

Feb. 28, 2019 (JP) .............................. JP2019-036449

(51) Int. Cl.
| | |
|---|---|
| *H04L 12/26* | (2006.01) |
| *H04W 24/08* | (2009.01) |
| *H04W 4/80* | (2018.01) |
| *H04W 84/12* | (2009.01) |

(52) U.S. Cl.
CPC ............. *H04L 43/50* (2013.01); *H04W 24/08* (2013.01); *H04W 4/80* (2018.02); *H04W 84/12* (2013.01)

(58) Field of Classification Search
CPC ........ H04L 43/50; H04W 24/08; H04W 4/80; H04W 84/12
See application file for complete search history.

(56) References Cited

U.S. PATENT DOCUMENTS

| | | | |
|---|---|---|---|
| 10,073,074 B1* | 9/2018 | Kumar | G01N 27/026 |
| 2009/0089005 A1* | 4/2009 | Hopcraft | G01R 31/31718 |
| | | | 702/123 |
| 2011/0238345 A1* | 9/2011 | Gauthier | G01R 31/002 |
| | | | 702/64 |
| 2018/0035312 A1* | 2/2018 | Mehrgardt | H04W 24/02 |

* cited by examiner

*Primary Examiner* — Kristie D Shingles
(74) *Attorney, Agent, or Firm* — Cantor Colburn LLP (57) ABSTRACT

A test system tests a DUT configured as a wireless device. A golden device is configured to provide bidirectional communication between it and the DUT. A measurement device acquires a first signal S1 including at least an output $S_{DUT}$ of the DUT. An interface unit monitors a second signal S2 including at least one of the output $S_{GD}$ of the golden device and the output $S_{DUT}$ of the DUT. In response to the occurrence of a predetermined waveform pattern in the second signal, the interface unit generates a trigger signal TRIG for instructing the measurement device to acquire a signal.

13 Claims, 6 Drawing Sheets

TEST SYSTEM

CROSS REFERENCES TO RELATED APPLICATIONS

The present application claims priority under 35 U.S.C. § 119 to Japanese Patent Application 2019-036449, filed on Feb. 28, 2019, the entire contents of which being incorporated herein by reference.

BACKGROUND OF THE INVENTION

1. Field of the Invention

The present invention relates to a test device for a wireless device.

2. Description of the Related Art

Various kinds of wireless devices including a communication mechanism that supports wireless LAN (Local Area Network), Bluetooth (trademark), Zigbee (trademark), or the like, have become widely used. Such wireless devices are tested by means of a test apparatus before shipping. Such tests of wireless devices are classified into a function test that supports pass/fail judgment and a parametric test that supports performance measurement. In the parametric test, the output power, signal distortion, bit error rate, etc. of the device under test are evaluated.

In a normal mode, the output signal of the wireless device intermittently occurs. As a method for testing such a wireless device that involves such intermittent operation, the following approaches are conceivable. As an approach, the output signal of the wireless device is continuously acquired over a long period of time regardless of whether or not the output signal of the wireless device occurs, and the signal thus acquired is evaluated. Typical wireless devices involve a long communication period of several hundred ms to several seconds. Accordingly, this approach requires an enormous amount of memory, leading to an increased cost.

As another approach, a test mode is implemented on the wireless device. In the test mode, the wireless device continuously or concentratedly generates a signal required for the test in a short period of time. This allows the required output signal of the wireless device to be acquired over a predetermined short period of time. This allows the memory capacity for the waveform acquisition to be reduced.

However, all wireless devices do not necessarily support such a test mode. Furthermore, it cannot necessarily be said that the wireless device in the test mode has the same electrical state and the same physical state as in the normal mode. Accordingly, there is a demand for a test of wireless devices in the normal mode state instead of the test mode even in a case in which the wireless device supports the test mode.

SUMMARY OF THE INVENTION

The present invention has been made in view of such a situation. Accordingly, it is an exemplary purpose of an embodiment of the present invention to provide a test system or an interface unit that is capable of testing a wireless device without a need for the test mode.

An embodiment of the present invention relates to a test system structured to test a device under test configured as a wireless device. The test system comprises: a golden device structured to provide bidirectional communication between it and the device under test; a measurement device structured to acquire a first signal including at least an output of the device under test; and an interface unit structured to monitor a signal transmitted between the golden device and the device under test, and to instruct the measurement device to acquire a signal in response to the occurrence of a predetermined waveform pattern.

Another embodiment of the present invention relates to an interface unit to be employed in a test system structured to test a device under test configured as a wireless device. The test system comprises: a golden device structured to provide bidirectional communication between it and the device under test; and a measurement device structured to acquire a first signal including at least an output of the device under test. The interface unit comprises: a splitter structured to acquire a part of a signal that propagates through a path between the golden device and the device under test; a detector structured to detect a signal extracted by the splitter; and a timing generator structured to generate a trigger signal for instructing the measurement device to acquire a signal based on an output of the detector.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Overview of the Embodiments

An embodiment disclosed in the present specification relates to a test system structured to test a device under test configured as a wireless device. The test system comprises: a golden device structured to provide bidirectional communication between it and the device under test; a measurement device structured to acquire a first signal including at least an output of the device under test; and an interface unit structured to monitor a signal transmitted between the golden device and the device under test, and to instruct the measurement device to acquire a signal in response to the occurrence of a predetermined waveform pattern.

A waveform pattern occurs in a signal transmitted between the golden device and the device under test according to a communication protocol to which the wireless device conforms. Accordingly, by monitoring such a signal, and by generating a trigger signal based on the occurrence of a predetermined waveform pattern, this arrangement is capable of acquiring a signal required for the evaluation of the wireless device without waste.

Also, the interface unit may generate the trigger signal based only on the output of the golden device. The golden device is sure to operate normally while the device under test is not sure to operate normally. Accordingly, by executing pattern matching with the output waveform of the golden device, this arrangement is capable of generating a trigger for waveform acquisition with high precision.

Also, the interface unit may comprise: a splitter structured to branch the output of the golden device to another path that differs from a path via which the output of the golden device flows toward the device under test; a detector structured to detect a signal that occurs in the different path; and a trigger generator structured to generate the trigger signal according to an output of the detector.

Also, the interface unit may further comprise a comparator structured to convert an output of the detector into a binary signal. Also, the trigger generator may detect a predetermined burst waveform based on the output of the comparator.

Also, the golden device and the device under test may be structured to provide the bidirectional communication between them via a common path. Also, the splitter may be configured as a directional coupler provided to the common path.

Also, the measurement device may be coupled to a sub-path branched from the common path. This allows the output of the device under test and the output of the golden device to be acquired at the same time.

Also, the measurement device may further acquire a second signal including only the output of the golden device obtained using a signal branched by means of the directional coupler. By calculating the difference between the first signal and the second signal, this arrangement is capable of extracting only the output of the device under test.

Also, the measurement device may comprise: an analyzer structured to convert an RF-band signal to be measured into a low-frequency signal; and a digitizer structured to convert an output of the analyzer into a digital signal.

Also, the test system may further comprise a tester controller structured to control the golden device, and to acquire an output of the measurement device.

Also, the test system may support a test using a wired signal.

Also, the interface unit may be mounted on a single board. By further providing the interface unit to an existing test system, this arrangement is capable of evaluating the device under test without a need for the test mode.

Embodiment

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

Figure 1:
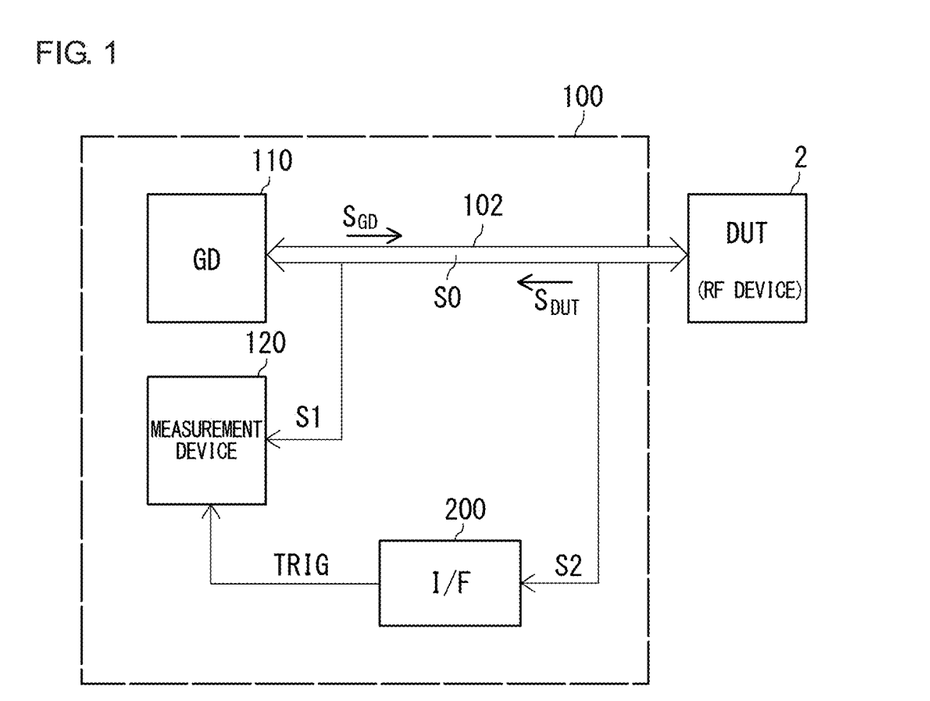
FIG. 1 is a block diagram showing a basic configuration of a test system according to an embodiment.

FIG. 1 is a block diagram showing s basic configuration of a test system 100 according to an embodiment. The test system 100 tests a DUT 2 configured as a wireless device. The test system 100 includes a golden device 110, a measurement device 120, and an interface unit 200.

The golden device 110 supports bidirectional communication between it and the DUT 2. Although the golden device 110 and the DUT 2 originally communicate with each other in a wireless manner, in the test, the communication between them may be provided in a wireless manner or otherwise a wired manner. The output signal of the golden device 110 will be represented by "$S_{GD}$". The output signal of the DUT 2 will be represented by "$S_{DUT}$". The communication path between the DUT 2 and the golden device 110 will be referred to as a "common channel 102".

The measurement device 120 is configured to acquire a first signal S1 including at least the output $S_{DUT}$ of the DUT 2.

The interface unit 200 monitors a second signal S2 including at least one of the output $S_{GD}$ of the golden device 110 and the output $S_{DUT}$ of the DUT 2. Upon detecting the occurrence of a predetermined waveform pattern, the interface unit 200 generates a trigger signal TRIG for instructing the measurement device 120 to acquire a signal. It should be noted that the "waveform pattern" as used here does not represent the waveform in the RF (Radio Frequency) band, but represents an envelope line of an RF signal.

The second signal S2 preferably includes only the output $S_{GD}$ of the golden device 110. One reason for this is that the communication between the golden device 110 and the DUT 2 is started under the initiative of the golden device 110. Another reason is that the golden device 110 is sure to operate normally while the DUT 2 is not sure to operate normally. Accordingly, it can be expected that the golden device 110 generates the signal $S_{GD}$ having a waveform pattern that conforms to a protocol defined by a given standard.

In response to the trigger signal TRIG the measurement device 120 starts to acquire the first signal S1. The test system 100 evaluates the performance of the DUT 2 based on the signal acquired by the measurement device 120.

Figure 2:
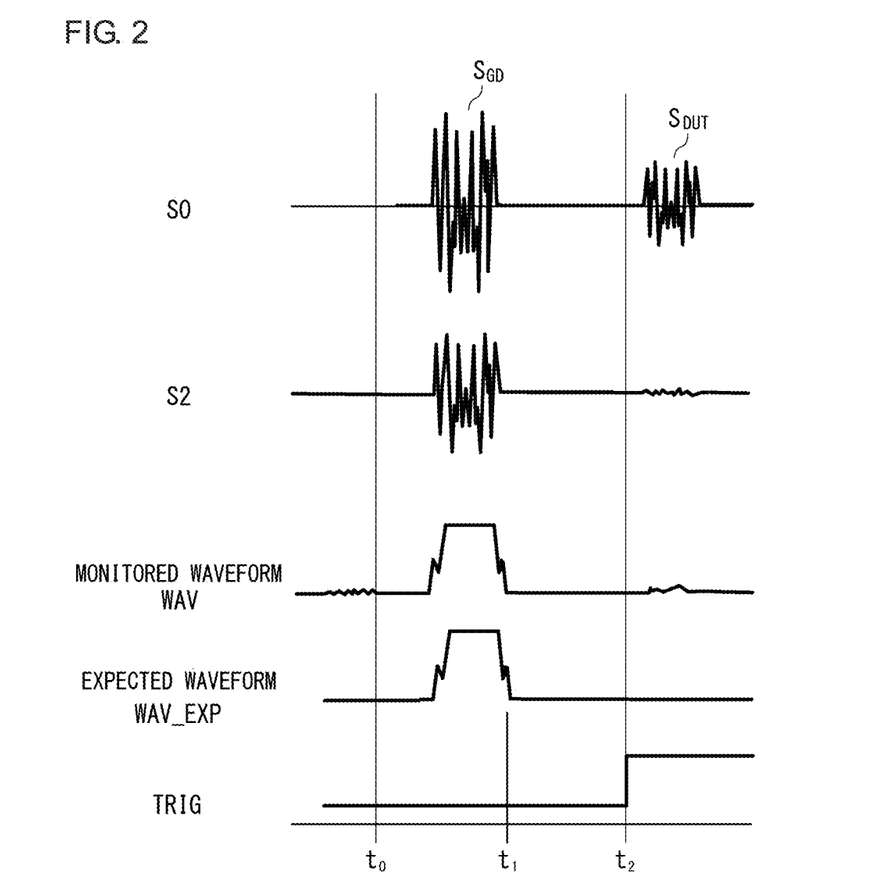
FIG. 2 is an operation waveform diagram showing the operation of the test system shown in FIG. 1.

The above is the basic configuration of the test system 100. Next, description will be made regarding the operation thereof. FIG. 2 is an operation waveform diagram of the test system 100 shown in FIG. 1. At the time point to, the test is started. "S0" represents a bidirectional signal transmitted via the common channel 102. The bidirectional signal S0 includes bidirectional components, i.e., the output $S_{GD}$ of the golden device 110 and the $S_{DUT}$ of the DUT 2. The interface unit 200 monitors the second signal S2 including only the output $S_{GD}$ of the golden device 110, and generates a trigger signal TRIG based on a monitored waveform WAV. As the monitored waveform WAV, the envelope curve of the second signal S2 can be employed. However, the monitored waveform WAV is not restricted to such an envelope curve. Specifically, the monitored waveform WAV is compared with its expected waveform WAV_EXP. The expected waveform WAV_EXP can be determined based on the wireless communication standard to which the DUT 2 conforms.

Pattern matching is detected at the time point $t_1$. At the time point $t_2$ immediately after the time point $t_1$ or otherwise after a predetermined period of time elapses from the time point $t_1$, the trigger signal TRIG is asserted. This allows the measurement device 120 to acquire the first signal S1 (not shown in FIG. 2) after the time point $t_2$.

The above is the operation of the test system 100. With the test system 100, the trigger signal TRIG is generated based on the occurrence of a predetermined waveform pattern, which allows a signal required for evaluation of the DUT 2 to be acquired without waste.

The present invention encompasses various kinds of apparatuses and methods that can be regarded as a block configuration shown in FIG. 1, or otherwise that can be derived from the aforementioned description. That is to say, the present invention is not restricted to a specific configuration. More specific description will be made below regarding example configurations and embodiments for clarification and ease of understanding of the essence of the present invention and the operation thereof. That is to say, the following description will by no means be intended to restrict the technical scope of the present invention.

Example 1

Figure 3:
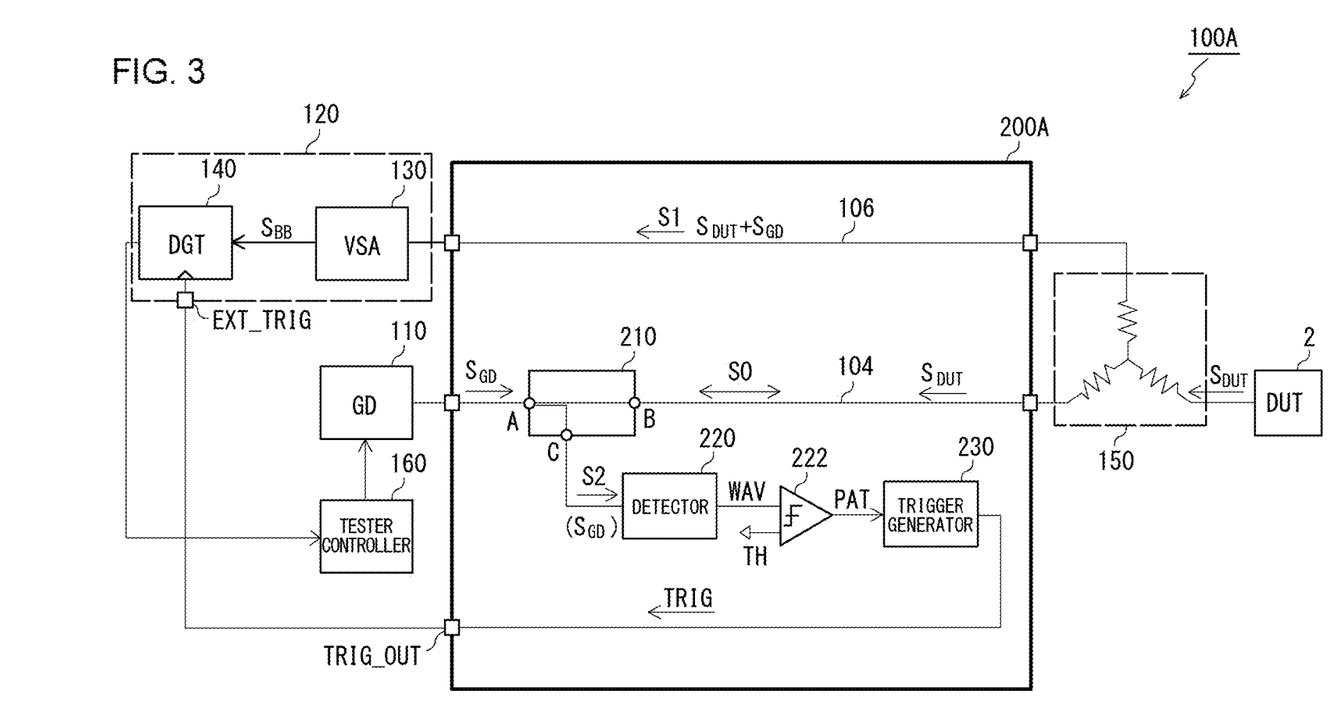
FIG. 3 is a block diagram showing a test system according to an example 1.

FIG. 3 is a block diagram showing a test system 100A according to an example 1. The DUT 2 and the golden device 110 are each configured such that its output can be acquired in a wired manner. The DUT 2 and the golden device 110 are coupled via a wired common path 104. The common path 104 corresponds to the common channel shown in FIG. 1. The test system 100A tests the DUT 2 based on a wired signal.

The test system 100A includes the golden device 110, the measurement device 120, an interface unit 200A, a distributor 150, and a tester controller 160.

The interface unit 200A is provided between the DUT 2 and the golden device 110, which is mounted on a single board. The interface unit 200A includes a splitter 210, a detector 220, a comparator 222, and a trigger generator 230.

The splitter 210 is provided on the common path 104 on which the bidirectional signal S0 including the two signals $S_{GD}$ and $S_{DUT}$ propagates. The splitter 210 branches a second signal S2 including only a part of the signal $S_{GD}$ to a path that differs from the common path 104. In other words, the splitter 210 branches the output signal $S_{GD}$ of the golden device 110 to another path that differs from a path via which it flows toward the DUT 2. As the splitter 210, a directional coupler may be employed, configured to extract only a signal that propagates from one port A to the other port B, and to output the signal thus extracted via a port C.

The detector 220 detects the second signal S2 so as to generate a waveform WAV. The trigger generator 230 generates the trigger signal TRIG based on the second signal S2.

As a downstream stage of the detector 220, a comparator 222 may be provided, which is configured to compare the waveform WAV with a threshold value so as to convert the waveform WAV into a pattern signal PAT configured as a high level/low level binary signal. In this case, the trigger generator 230 compares the pattern signal PAT in the form of a high level/low level binary signal with its expected waveform PAT_EXT. Accordingly, the trigger generator 230 is capable of generating the trigger signal TRIG. This arrangement is capable of performing pattern matching based only on a transition waveform configured as a binary signal that transits between high level and low level in the time axis direction without giving consideration to amplitude information. For example, the trigger generator 230 may include a timer circuit that measures the length of the high period and/or the length of the low period of the pattern signal PAT. The trigger signal TRIG is supplied to the measurement device 120 via a trigger output pin TRIG_OUT.

A sub-path 106 is coupled to the common path 104 via the distributor 150. The first signal S1 occurs in the sub-path 106 according to the bidirectional signal S0 including both the output $S_{DUT}$ of the DUT2 and the output $S_{GD}$ of the golden device 110. It should be noted that the distributor 150 may be built into the interface unit 200.

The measurement device 120 is coupled to the sub-path 106. The measurement device 120 acquires the first signal S1 including both the output $S_{DUT}$ of the DUT 2 and the output $S_{GD}$ of the golden device 110.

The measurement device 120 includes a vector signal analyzer 130 and a baseband waveform digitizer 140. The vector signal analyzer 130 frequency-converts the first signal S1 having an RF-band frequency into a baseband signal $S_{BB}$ having a baseband frequency (down conversion). The baseband waveform digitizer 140 samples the baseband signal $S_{BB}$ thus down-converted, so as to convert the baseband signal $S_{BB}$ into a digital signal. The measurement device 120 includes an external trigger terminal EXT_TRIG The baseband waveform digitizer 140 starts to acquire the baseband signal $S_{BB}$ based on the trigger signal TRIG input to the external trigger terminal EXT_TRIG The test controller 160 controls the golden device 110. Furthermore, the test controller 160 acquires the output of the measurement device 120.

Figure 4:
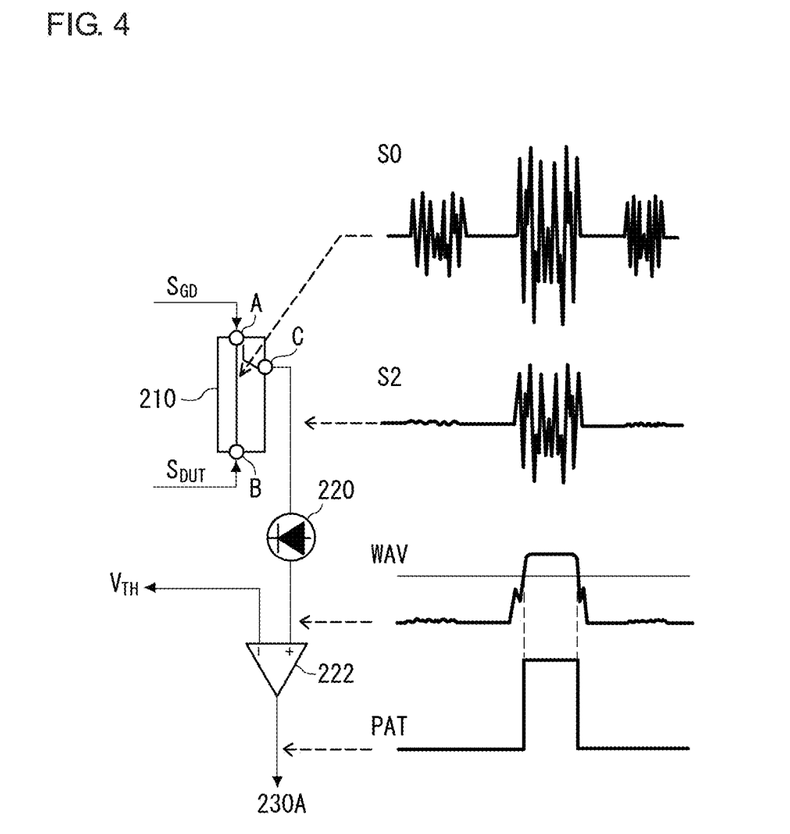
FIG. 4 is a diagram for explaining the operation of the test system shown in FIG. 3.

The above is the configuration of the test system 100A. FIG. 4 is a diagram for explaining the operation of the test system 100A shown in FIG. 3. The splitter 210 generates the second signal S2 including only the output $S_{GD}$ of the golden device 110. The detector 220 detects an envelope curve of the second signal S2 so as to generate the monitored waveform WAV. The comparator 222 compares the monitored waveform WAV with a threshold value TH, so as to convert the monitored waveform WAV into a digital pattern signal PAT in the form of a high level/low level binary signal.

Figure 5:
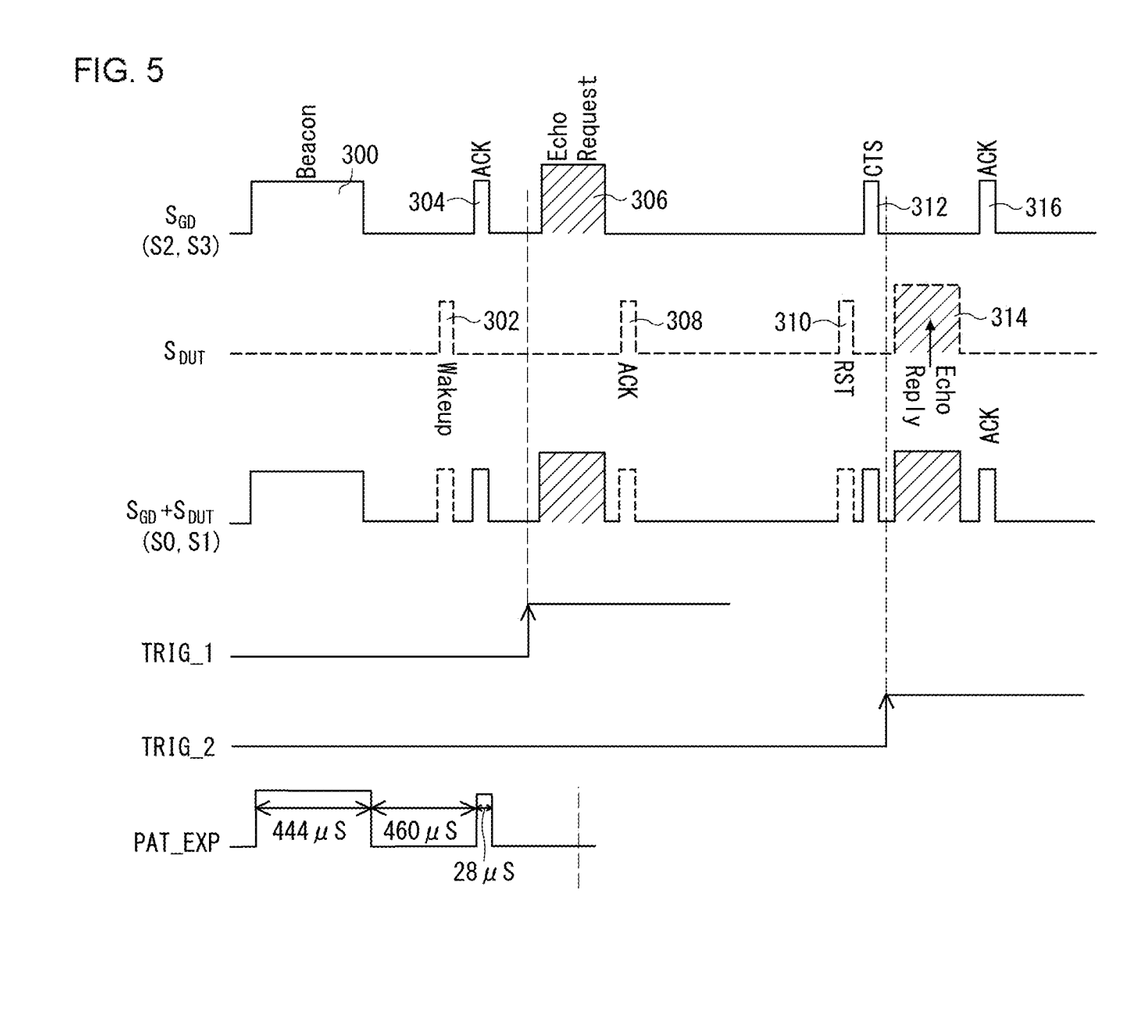
FIG. 5 is a diagram for explaining a test for a DUT that conforms to the Wi-Fi standard.

Description will be made regarding the operation of the test system 100A with reference to an example in which a Wi-Fi (trademark) device is tested. FIG. 5 is a diagram for explaining a test of the DUT 2 that conforms to the Wi-Fi standard. FIG. 5 shows the output $S_{GD}$ of the golden device 110, the output $S_{DUT}$ of the DUT 2, and the bidirectional signal S0 including the two outputs $S_{GD}$ and $S_{DUT}$. Each waveform is shown in the form of a simplified pattern as detected such that it is converted into a binary value. The golden device 110 is configured as a Wi-Fi router (access point).

The golden device 110 generates a beacon 300 over a predetermined period of time. In response to the beacon 300, the DUT 2 generates a startup (Wakeup) signal 302. In response to the startup signal 302, the golden device 110 returns an acknowledge signal 304. Subsequently, the golden device 110 generates an echo request 306. In response to the echo request 306, the DUT 2 returns an acknowledge signal 308. Subsequently, the DUT 2 transmits a send request (RTS: Request to Send) 310. The golden device 110 supplies send permission (CTS: Clear to Send) 312. In response to the send permission 312, the DUT 2 transmits an echo reply 314. Upon receiving the echo reply 314, the golden device 110 returns an acknowledge signal 316.

In such a series of sequences, the echo request 306 generated by the golden device 110 and the echo reply 314 are to be captured, which are each shown as a hatched region.

The test system 100A shown in FIG. 4 monitors the second signal S2 including only the output $S_{GD}$ of the golden device 110. With such an arrangement, a waveform pattern including the waveform of the beacon 300 and the waveform of the acknowledge signal 304 which is a subsequent signal of the beacon 300 are to be detected. The expected pattern PTN_EXP is configured to have a high period of 444 µs, a low period of 460 µs, and a high period of 28 µs.

Upon detecting waveform pattern matching at a negative edge of the acknowledge signal 304 pattern, trigger signals TRIG1 and TRIG2 are asserted at different timings with the pattern matching time point as the reference time point. The measurement device 120 is capable of acquiring a third signal S3 in response to the trigger signal TRIG1, and of acquiring the first signal S1 in response to the trigger signal TRIG2.

Example 2

Figure 6:
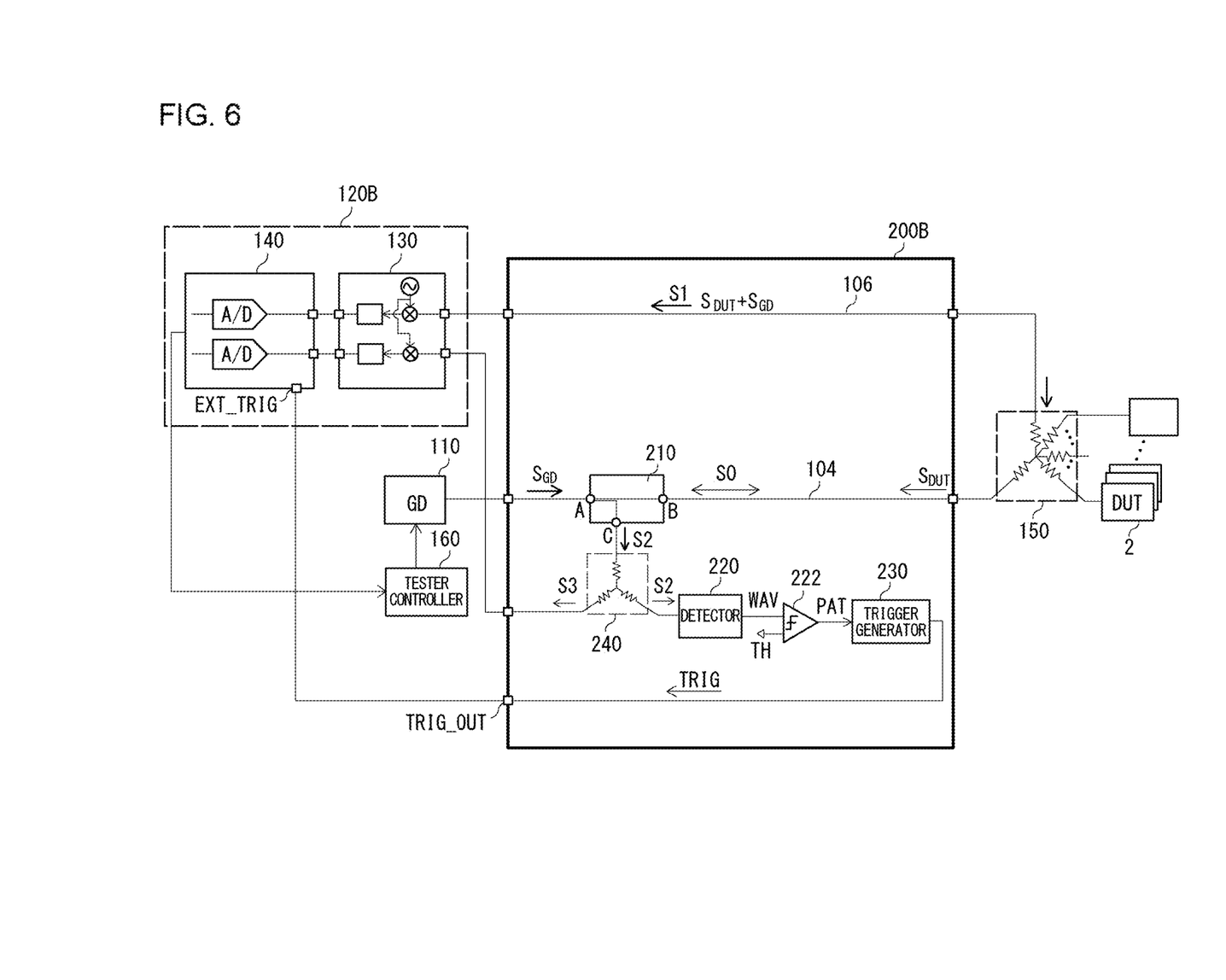
FIG. 6 is a block diagram showing a test system according to an example 2.

FIG. 6 is a block diagram showing a test system 100B according to an example 2. In this example, a measurement device 120B is configured to be capable of acquiring the third signal S3 including only the output $S_{GD}$ of the golden device 110 in addition to the first signal S1 including both the output $S_{GD}$ of the golden device 110 and the output $S_{DUT}$ of the DUT 2.

The third signal S3 is generated based on the second signal S2 branched by the splitter 210, which is a directional coupler. In order to provide such a function, an interface unit 200B is provided with a distributor 240 that extracts a part of the second signal S2 branched by the splitter 210 so as to generate the third signal S3.

The third signal S3 is supplied to the measurement device 120B together with the first signal S1. The measurement device 120B is configured as a two-channel measurement device. The vector signal analyzer 130 down-converts the first signal S1 and the third signal S3 so as to generate two baseband signals $S_{BB\_DUT}$ and $S_{BB\_GD}$, respectively. The baseband waveform digitizer 140 converts the baseband signals $S_{BB\_DUT}$ and $S_{BB\_GD}$ into respective digital signals.

In this example, multiple DUTs 2 are coupled to the distributor 150 at the same time. This arrangement allows such multiple DUTs 2 to be measured in a time-sharing manner or otherwise at the same time.

Description has been made above regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Modification 1

Description has been made in the examples 1 and 2 regarding an arrangement employing a directional coupler in order to generate the second signal S2 including only the output $S_{GD}$ of the golden device 110. However, the present invention is not restricted to such an arrangement. In a case in which there is a difference in frequency between the output $S_{GD}$ of the golden device 110 and the output $S_{DUT}$ of the DUT 2, a filter may be employed instead of such a directional coupler.

Modification 2

Description has been made in the examples 1 and 2 regarding an arrangement in which the trigger signal TRIG is generated based on the second signal S2 including only the output $S_{GD}$ of the golden device 110. However, the present invention is not restricted to such an arrangement. The interface unit 200 may generate the trigger signal TRIG based on the second signal S2 including both the output $S_{GD}$ of the golden device 110 and the output $S_{DUT}$ of the DUT 2. Alternatively, the interface unit 200 may generate the trigger signal TRIG based on the second signal S2 including only the output $S_{DUT}$ of the DUT 2. The signal to be monitored may be preferably determined for each wireless communication standard giving consideration to the ease of detection of the waveform pattern and the detection precision.

Modification 3

Description has been made in the examples 1 and 2 regarding an arrangement in which the measurement is performed in a wired manner. Also, the measurement may be performed in a wireless manner. In this case, the interface unit 200 may preferably be further provided with an antenna configured to receive wireless communication between the DUT 2 and the golden device 110, and may preferably be configured to generate a trigger signal based on a signal pattern received via the antenna. Also, the signal thus received via the antenna may preferably be captured by the measurement device 120.

While the preferred embodiments of the present invention have been described using specific terms, such description is for illustrative purposes only, and it is to be understood that changes and variations may be made without departing from the spirit or scope of the appended claims.

What is claimed is:

1. A test system structured to test a device under test configured as a wireless device, the test system comprising:
   a golden device structured to perform bidirectional communication with the device under test;
   a measurement device structured to capture a first signal including at least an output for the bidirectional communication of the device under test; and
   an interface unit structured to monitor a second signal including at least one of an output for the bidirectional communication of the golden device and the output for the bidirectional communication of the device under test, and to instruct the measurement device to capture the first signal in response to an occurrence of a predetermined waveform pattern in a time-domain waveform of the second signal.

2. The test system according to claim 1, wherein the second signal includes only the output for the bidirectional communication of the golden device.

3. The test system according to claim 1, wherein the interface unit comprises:
   a splitter structured to branch the output for the bidirectional communication of the golden device to another path that differs from a path via which the output for the bidirectional communication of the golden device flows toward the device under test;
   a detector structured to detect the second signal that occurs in the different path; and
   a trigger generator structured to generate the trigger signal when the predetermined waveform pattern is detected in a time-domain waveform of an output of the detector.

4. The test system according to claim 3, wherein the golden device and the device under test are structured to provide the bidirectional communication between them via a common path,
   and wherein the splitter is configured as a directional coupler provided to the common path.

5. The test system according to claim 3, wherein the interface unit further comprises a comparator structured to convert an output of the detector into a binary signal,
   and wherein the trigger generator detects a predetermined expected waveform based on the output of the comparator.

6. The test system according to claim 5, wherein the measurement device is coupled to a sub-path branched from the common path.

7. The test system according to claim 6, wherein the measurement device further captures a third signal including only the output for the bidirectional communication of the golden device obtained using the second signal branched by means of the directional coupler.

8. The test system according to claim 1, wherein the measurement device comprises:
   an analyzer structured to convert an RF-band signal to be measured into a low-frequency signal; and
   a digitizer structured to convert an output of the analyzer into a digital signal.

9. The test system according to claim 1, further comprising a tester controller structured to control the golden device, and to capture an output of the measurement device.

10. The test system according to claim 1, structured to support a test using a wired signal.

11. The test system according to claim 1, wherein the interface unit is mounted on a single board.

12. An interface unit to be employed in a test system structured to test a device under test configured as a wireless device, wherein the test system comprises:
   a golden device structured to perform bidirectional communication with the device under test; and
   a measurement device structured to capture a first signal including at least an output for the bidirectional communication of the device under test,
   and wherein the interface unit comprises:
     a splitter structured to extract a part of a signal that propagates through a path for the bidirectional communication between the golden device and the device under test;
     a detector structured to detect a signal extracted by the splitter; and
     a timing generator structured to generate a trigger signal for instructing the measurement device to capture the first signal when a predetermined waveform pattern is detected in a time-domain waveform of an output of the detector.

13. The interface unit according to claim 12, wherein the golden device and the device under test are structured to provide the bidirectional communication between them via a common path,
   and wherein the splitter is configured as a directional coupler provided to the common path.

* * * * *